Figure 1:
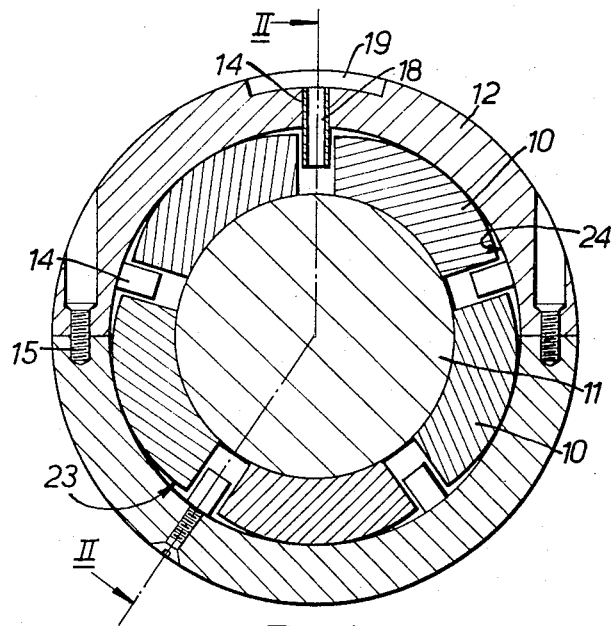

United States Patent [19]
Stopp

[11] 3,807,814
[45] Apr. 30, 1974

[54] JOURNAL BEARINGS

[75] Inventor: Peter Gordon Stopp, Hillingdon, England

[73] Assignee: The Glacier Metal Company Limited, Wembley, Middlesex, England

[22] Filed: June 23, 1972

[21] Appl. No.: 265,729

[30] Foreign Application Priority Data
June 24, 1971  Great Britain .................... 29551/71

[52] U.S. Cl. ................................................. 308/73
[51] Int. Cl. ............................................ F16c 17/03
[58] Field of Search ...................... 308/73, 160, 122

[56] References Cited
UNITED STATES PATENTS
3,549,215  12/1970  Hollingworth ....................... 308/73
3,542,440  11/1970  Brand .................................. 308/73

FOREIGN PATENTS OR APPLICATIONS
883,820  12/1961  Great Britain ....................... 308/73

Primary Examiner—Charles J. Myhre
Assistant Examiner—Frank Susko
Attorney, Agent, or Firm—Pierce, Scheffler & Parker

[57] ABSTRACT

This invention is a tilting pad journal bearing in which a number of circumferentially spaced bearing pads are individually located in relation to a housing without being assembled with spacers separating them from each other and without being positively secured to the housing and this is achieved by stops extending radially inwardly from the housing between adjacent pads.

6 Claims, 2 Drawing Figures

PATENTED APR 30 1974   3,807,814

JOURNAL BEARINGS

This invention relates to journal bearings of the tilting pad type in which a ring of circumferentially spaced bearing pads are each capable of tilting in a housing on an axis parallel with the journal housing and one object of the present invention is to provide a simplified construction of such a bearing which can be assembled and dis-assembled for maintenance, replacement or adjustment quite simply.

According to the invention the pads are located in the housing against circumferential movement in relation to the housing, for example, by means of stops secured to the housing.

This arrangement is simpler than, for example, an arrangement in which the pads are separated from one another by spacers either positioned between them or assembled with them because such an arrangement would require the pads and spacers to be pre-assembled and then fitted as a sub-assembly in the housing or would require them to be assembled individually in the housing, either of which arrangements tends to be rather difficult and to require skilled labour.

The bearing may include a ring at one or each end of the bearing having a seal with the journal surface. Such a ring can hold the bearing assembled but after removal can allow individual pads to be withdrawn from the housing by axial movement.

The stops themselves can be shaped to allow the pads in the absence of journals to move radially inwards from the housing but not sufficiently to be released. Thus before the journal is inserted or after it has been removed, the pads will be loose in the housing but will be retained in position by the stops and will not drop out of the assembly without being moved axially.

Figure 2:
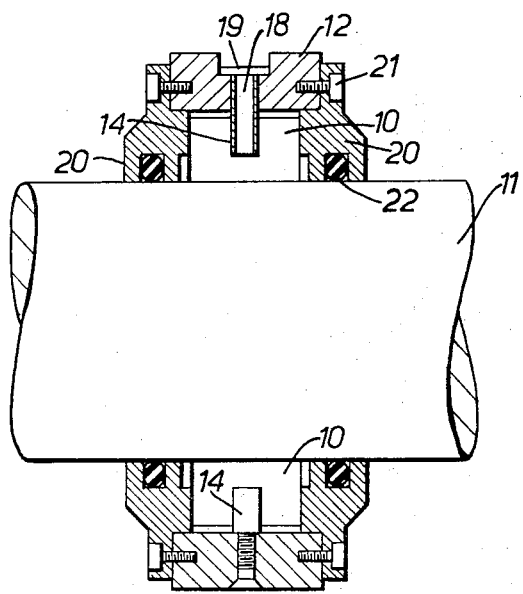

The invention may be carried into practice in various ways and one embodiment will be described by way of example with reference to the accompanying drawings, of which:

FIG. 1 is a section of a journal bearing according to the invention on a plane perpendicular to the axis of the journal; and FIG. 2 is a section taken on the line II—II in FIG. 1.

A bearing for the journal 11 comprises five identical journal bearing pads 10 individually positioned in but not positively secured to, a housing 12. For this purpose stops 14 extend radially inwardly from the housing and act to separate adjacent pads one from the other. The stops are parallel-sided of square cross-section and would allow the pads in the absence of the journal 11 to slide radially inwardly until they take up the small circumferential gap between the sides of the stops and the opposing edges of the pads when further radial movement is prevented, so that the pads are held loosely assembled in the housing even in the absence of the journal.

The pads are normally located against axial movement by a pair of end rings 20 (FIG. 2) secured to the sides of the housing 12 by bolts 21 and each containing a sealing ring 22 against escape of lubricant along the journal. If either ring 20 is removed after release of the bolts 21 the bearing pads can be slid axially out of the housing for maintenance or replacement.

The bearing may operate in a bath or lubricant could be provided through a radial passage 18 extending through one or more of the stops 14 from a lubricant recess 19 formed in the outer part of the housing.

Each bearing pad has a back surface 23 which is a cylindrical surface with a radius of curvature smaller than the radius of curvature of the inner cylindrical surface 24 of the housing 12 so that the pads can rock or tilt individually about axes parallel with the axis of the journal.

Assembly and dis-assembly of the journal is very simple. If the housing was in one piece the pads could be assembled simply by being slid into place axially as described above but the housing could be a split housing as shown in FIG. 1 so that after removal of bolts 15 the top half could be removed and with it the top two pads are seen as in FIG. 1; after which the next two pads could be slid out circumferentially, and then finally the lower half could be rotated around the journal with the bottom pad and lifted clear of the journal.

What I claim as my invention and desire to secure by letters Patent is:

1. A journal bearing comprising a journal, a housing, a ring of circumferentially spaced bearing pads each capable of tilting in the housing independently of the other pads about an axis parallel with the journal housing, and stop means in the housing locating the pads against circumferential movement in relation to the housing, the circumferential length of said pads being such that said pads have limited radial movement inward from said housing, the inward radial movement in the absence of said journal being limited by contact of said pads with said stop means and ring means at the end of said housing which normally retains said pads in axial location but which is removable to allow said pads to be withdrawn from said housing by axial movement.

2. A bearing as claimed in claim 1 in which the stop means comprise radially-extending stops secured to the housing.

3. A bearing as claimed in claim 2 including a lubricating passage extending through at least one of the stops for lubricating the journal surfaces.

4. A bearing as claimed in claim 1 in which the pads have curved back faces in contact with, but of smaller radius of curvature than, an internal cylindrical surface of the housing.

5. A bearing as claimed in claim 1 said ring means having a seal in contact with the surface of said journal, whereby lubricant may be retained without leakage within said housing.

6. A bearing as claimed in claim 5 wherein said ring means are attached to both ends of said housing, whereby said pads may be removed from said housing by axial movement in either direction.

* * * * *